United States Patent [19]

Jorgensen

[11] Patent Number: 4,870,327
[45] Date of Patent: Sep. 26, 1989

[54] HIGH FREQUENCY, ELECTRONIC FLUORESCENT LAMP BALLAST

[75] Inventor: Jeffrey A. Jorgensen, Bothell, Wash.

[73] Assignee: Avtech Corporation, Seattle, Wash.

[21] Appl. No.: 77,760

[22] Filed: Jul. 27, 1987

[51] Int. Cl.$^4$ ............................................ H05B 41/36
[52] U.S. Cl. ..................................... 315/307; 315/308
[58] Field of Search ......... 315/306, 307, 308, DIG. 4, 315/DIG. 7, 194, 219

[56] References Cited

U.S. PATENT DOCUMENTS

| | | | |
|---|---|---|---|
| 4,158,793 | 6/1979 | Lewis | 315/101 |
| 4,240,009 | 12/1980 | Paul | 315/224 |
| 4,300,075 | 11/1981 | Foose et al. | 315/307 |
| 4,358,716 | 11/1982 | Cordes et al. | 315/306 |
| 4,383,204 | 5/1983 | Roberts | 315/291 |
| 4,392,087 | 7/1983 | Zansky | 315/219 |
| 4,464,606 | 8/1984 | Kane | 315/158 |
| 4,477,748 | 10/1984 | Grubbs | 315/306 |
| 4,492,899 | 1/1985 | Martin | 315/308 |
| 4,508,995 | 4/1985 | Gajecki | 315/209 |
| 4,511,195 | 4/1985 | Barter | 315/308 |
| 4,523,131 | 6/1985 | Zansky | 315/307 |
| 4,560,908 | 12/1985 | Stupp et al. | 315/307 |
| 4,616,159 | 10/1986 | Ko et al. | 315/307 |
| 4,626,746 | 12/1986 | Zaderej | 315/208 |

OTHER PUBLICATIONS

"A dimmable (1000:1 range) fluorescent ballast for instrument panel lighting", by P. O. Lauritzen et al., Journal of IES, Jan. 1983, pp. 86-90.

Primary Examiner—Robert L. Griffin
Assistant Examiner—T. Salindong
Attorney, Agent, or Firm—Stephen A. Becker

[57] ABSTRACT

A ballast for controlling the light emitted by fluorescent lamps (25) is disclosed. DC power derived from either a DC source or a rectified AC source is switched on and off at a high frequency rate by a switch (15) to control the flow of current through the primary winding of the transformer of a flyback converter (27). The switched output is rectified and applied by the flyback converter to the filaments of the fluorescent lamps (25) to be controlled. The rectified, switched output is also applied by a $\pi$ filter (17) to a commutator circuit (21) that controls the starting of the fluorescent lamps (25). The commutator circuit (21) is switched at a lower frequency rate. The bridge input voltage and current are sensed and fed back to a control circuit (23), which includes a regulating pulse width modulator and a bridge switching circuit. The control circuit (23) also receives a pulse current feedback signal from the switch (15) and an external dimming control signal. The control circuit (23) controls the application of high frequency switching signals to the switch (15) that controls the application of power by the flyback converter based on the voltage, current and pulse current feedback signals. Which one of these three signals actually controls is determined by which signal first reaches a reference level. If the magnitude of the feedback voltage first reaches the magnitude set by an open circuit voltage reference, the feedback voltage signal controls. If the magnitude of the feedback pulse current signal first exceeds a predetermined magnitude, the feedback pulse current signal controls. If the feedback current first exceeds a reference magnitude controlled by the external dimming control, the feedback current signal controls.

60 Claims, 5 Drawing Sheets.

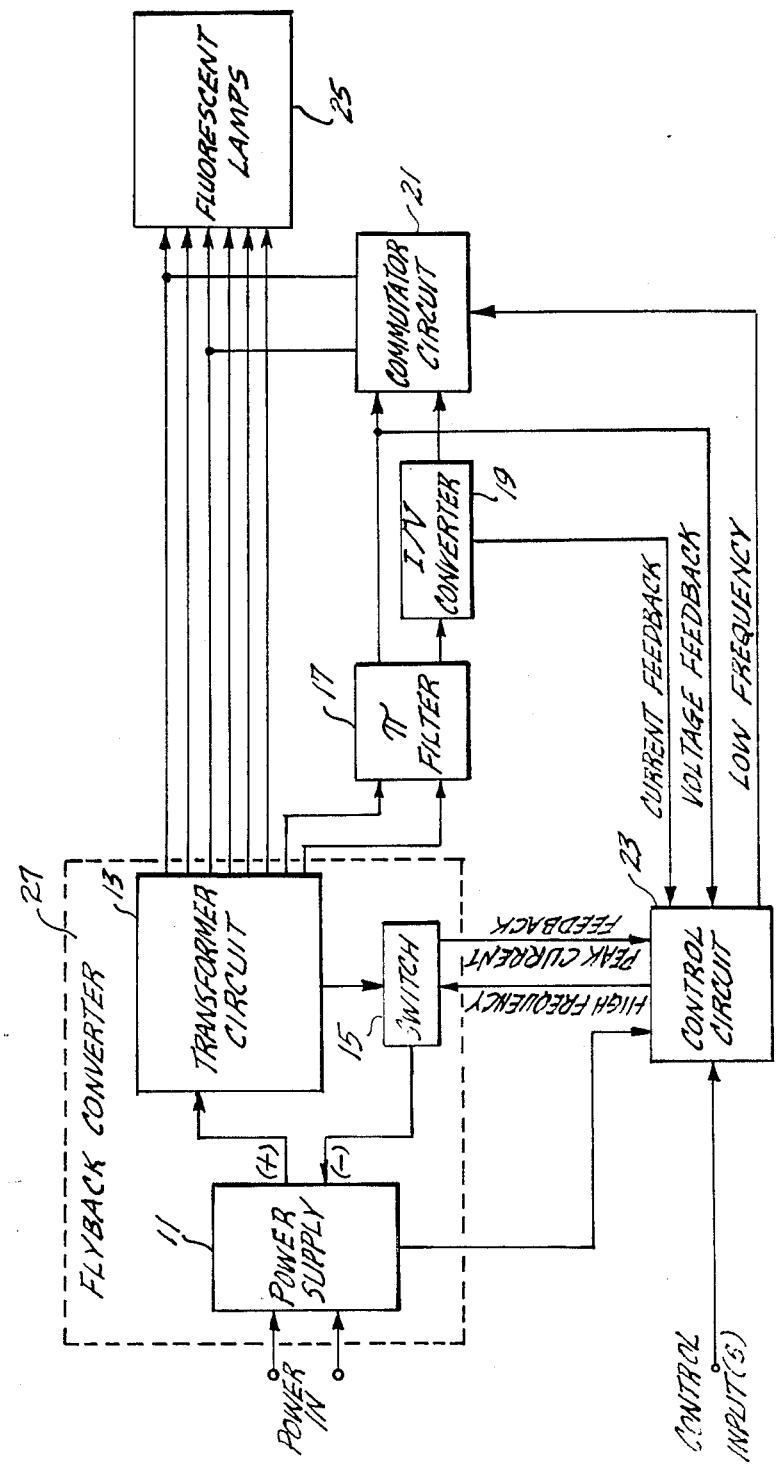

HIGH FREQUENCY, ELECTRONIC FLUORESCENT LAMP BALLAST

TECHNICAL AREA

This invention relates to ballasts for gas discharge lamps and, more particularly, ballasts for starting, controlling and dimming gas discharge, e.g., fluorescent lamps.

BACKGROUND OF THE INVENTION

Fluorescent lamps are used in a variety of environments ranging from residential and commercial buildings to aircraft. (While this invention was developed for use in aircraft, and is described in connection with such use, it is to be understood that the invention can also be used in other environments.) Modern commercial aircraft have begun using fluorescent lamps in cockpit aircraft instrument panel floodlighting systems and in aircraft cabins in order to obtain the constant, more appealing color temperature and uniform diffuse light generated by flurrescent lamps, and to avoid the heat generated by incandescent lamps, which is difficult to dissipate. In order for fluorescent lamps to be usable in aircraft instrument panel floodlighting systems, they must be able to offer a range of illumination levels. Under bright sunlight conditions, instrument panel floodlighting must have the ability to fill in shadows. Under nighttime flying conditions, instrument panel floodlighting must be low enough to not distract a pilot from seeing nighttime features with fully dark adapted eyes. Thus, in order for fluorescent lamps to be usable in aircraft instrument panel floodlighting systems, they must be dimmable..The use of fluorescent light in cabin illumination systems on aircraft designed for long flights is highly desirable because the effect of the soft light provided by fluorescent lamps provides a more comfortable environment. It is also desirable to dim, albeit at much lower ratios, aircraft cabin illumination systems so that lighting can be reduced for sleeping. Because weight and size are at a premium onboard an aircraft, it is desirable that the control system, or ballast, for controlling aircraft fluorescent lamps be lightweight and compact.

One way of creating a dimmable fluorescent lamp is to use an electronic ballast to control the starting and operation of the lamp. Electronic ballasts, whether dimmable or not, are particularly desirable in an aircraft environment because electronic ballasts, as opposed to other types of ballasts, such as non-switching iron core magnetic ballasts, are usually small, lightweight and highly efficient, and easy to control with low power signals. Unfortunately, in the past, electronic ballasts have had a number of features that have made them less desirable for use in aircraft instrument panel floodlighting systems as well as in other environments.

The conventional approach to provide an electronic ballast is to convert input AC to DC (if the input voltage is not DC) and, then, convert DC to high frequency AC. The high frequency AC is used to power the fluorescent lamp or lamps. Typically, the AC frequency is above 10 kHz because operating fluorescent lamps at frequencies greater than 10 kHz increases the lumens per watt (e.g., the efficiency) of fluorescent lamps. Weight advantages are realized simply because the weight of high frequency transformers and inductors is less than the weight of low frequency transformers and inductors.

In conventional high frequency ballasts, a voltage sufficiently large to start the lamp is shaped into a sine wave by an L-C tank circuit. Current limiting is provided by an inductive device similar to the inductive devices used in lower frequency (e.g., 400 Hz) ballasts. A major disadvantage of this ballast circuitry is that it provides poor magnetic volt-ampere utilization.

Another disadvantage of conventional high frequency electronic ballasts, as well as other ballasts, is the need to store energy to keep the lamp lit during the valley between rectified sine wave half cycles. Typically, this is done by placing a hold-up capacitor on the DC side of the input rectifier. The use of a hold-up capacitor introduces several problems and trade offs. If the capacitor is large, the input conduction angle becomes small, resulting in poor power factor, large peak input current, and huge turn-on surge currents. Large current flows require the inclusion of expensive components designed to handle the contemplated current without breakdown. Contrariwise, if the hold-up capacitor is relatively small, the magnetic portion of the circuit must be increased to provide still more boost and drop. Further, the lamp crest factor is increased by the resultant increase in the ripple of the input voltage.

Because most conventional high frequency electronic ballasts operate open loop, line amplitude variations produce lamp intensity variations. Further, because conventional high frequency electronic ballasts use high frequency starting and operating power, they generate an undesirable amount of electromagnetic interference (EMI).

The present invention is directed to providing an electronic ballast for gas discharge tubes, e.g., fluorescent lamps, that overcomes the disadvantages of prior art high frequency, electronic lamp ballasts.

SUMMARY OF THE INVENTION

In accordance with this invention, a high frequency, electronic ballast for starting, controlling and dimming the light emitted by fluorescent lamps is provided. DC power, which may be derived from either a DC source or a rectified AC source, is coupled by a DC-to-DC converter to the fluorescent lamps to be controlled. More specifically, the DC power is applied to the primary winding of a transformer and is switched on and off at a high frequency rate. The output of the resultant flyback converter is rectified and coupled to the filaments of the fluorescent lamps to be controlled. Low voltage outputs to heat the filaments are provided as well as a higher voltage output that provides arc power. The DC arc power output drives a commutator circuit. The commutator circuit is switched at a substantially lower frequency. Commutator circuit current and voltage are sensed and fed back to a control circuit. The control circuit also receives a feedback signal from the flyback converter that denotes the magnitude of the transformer peak current on a pulse-by-pulse basis, plus an external dimming control signal. The control circuit controls the application of high frequency switching signals to the switch that controls the application of power to the primary winding of the flyback transformer. Which one of the feedback signals is actually used to control the application of high frequency switching signals to the flyback transformer is determined by which signal first reaches a reference level (e.g., which feedback signal commands the least power). If the commutator current feedback signal first reaches a value set by the external dimming control signal, the commutator current feedback signal controls. If the magnitude of the transformer peak current feedback signal first exceeds a predetermined magnitude, the transformer peak current feedback signal controls. The voltage and current signals derived from the commutator circuit effect the high frequency switch on an average basis, whereas the transformer peak current signal terminates switch conduction instantaneously. It is possible, in fact desirable, for both the commutator current feedback and the transformer peak current feedback signals to both be active over the course of a rectified sine wave half cycle. The transformer peak current feedback signal typically is active (i.e., takes over control) at the peak of the input sine wave. During this time average commutator circuit current is low. As a result the error signal associated with the commutator circuit current signal is increased. When the input voltage progresses past its peak, the increased commutator circuit current error signal causes more current to flow than would have flowed had the peak current feedback signal not been active. Thus, an average is maintained despite intermittent activity of the peak current feedback signal.

In accordance with further aspects of this invention, the control circuit compares the commutator circuit voltage with an open circuit voltage reference and the current with a reference determined by the external dimming control signal. Either commutator circuit open circuit voltage or commutator circuit current flow can be used to control (e.g., terminate), the application of high frequency switching signals to the switch. Again, which signal actually controls is dependent upon which signal first reaches its reference level. Using transformer peak current and commutator current and voltage feedback signals to limit the magnitude of the high frequency switching signals allows the system to maintain peak magnitude below a prescribed limit. As a result, lower peak rated components can be used.

In accordance with other aspects of this invention, preferably, the control circuit causes the switch to open and close at a frequency of 100 kHz or greater. As a result, the transformer of the flyback converter is relatively small. Preferably, the transformer secondary windings are wound and positioned such that the shorting of a filament does not destroy the transformer. Specifically, preferably, the transformer has a multi-legged core, such as an EE core or a pot core. The filament (secondary) windings are wound on opposing outer legs and the primary winding is wound on the center leg. This construction provides an integrated-magnetic current transformer that forces current sharing between filament windings. The net effect is that the filament winding voltages and currents behave as if the filaments were connected in series. Thus, a shorted filament only produces a current doubling. Further, preferably, the flyback transformer is operated in a discontinuous mode, i.e., the current stored in the transformer is completely discharged before the next switching cycle begins. Discontinuous operation has the advantage of providing proportional power conversion, rather than proportional voltage conversion, for a fixed duty cycle. Further, transformer size is minimized and control loop compensation is simplified. In addition, this feature allows operation without a large current limiting device, because the output is not a voltage source.

In embodiments of the invention wherein power is derived from a rectified relatively low frequency AC source, the AC signal is utilized to drive the commutator circuit. In a DC version, the commutator circuit is switched by a DC powered switching circuit at a relatively low frequency rate. Switching the commutator circuit at a relatively low frequency rate, rather than at the frequency at which the flyback converter switch is opened and closed, minimizes electromagnetic interference. The improved luminous efficiency produced by operating a fluorescent lamp above 10 kHz can be realized by operating the bridge at this frequency. The circuit is still smaller and lighter than prior art 10 kHz ballast circuits because 100 kHz or greater conversion can still be used by the flyback transformer. If desired, embodiments of the invention using the industry trend of conversion frequencies of 1 MHz and above can be formed.

As will be readily appreciated from the foregoing summary description, a high frequency, electronic fluorescent ballast formed in accordance with this invention overcomes the disadvantages of prior art high frequency, electronic fluorescent ballasts, without losing the advantages of such ballasts. Because high frequency power is utilized, transformer efficiency is maximized while transformer size and weight is minimized. Electromagnetic interference is minimized because the commutator circuit is operated at a relatively low frequency. Component cost is minimized by keeping peak power low. Lamp life is maximized through control of lamp current crest factor and arc vs. filament voltage slew rate.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is a block diagram of a high frequency, electronic fluorescent lamp ballast formed in accordance with the invention;

DESCRIPTION OF THE PREFERRED EMBODIMENTS

Figure 2A:
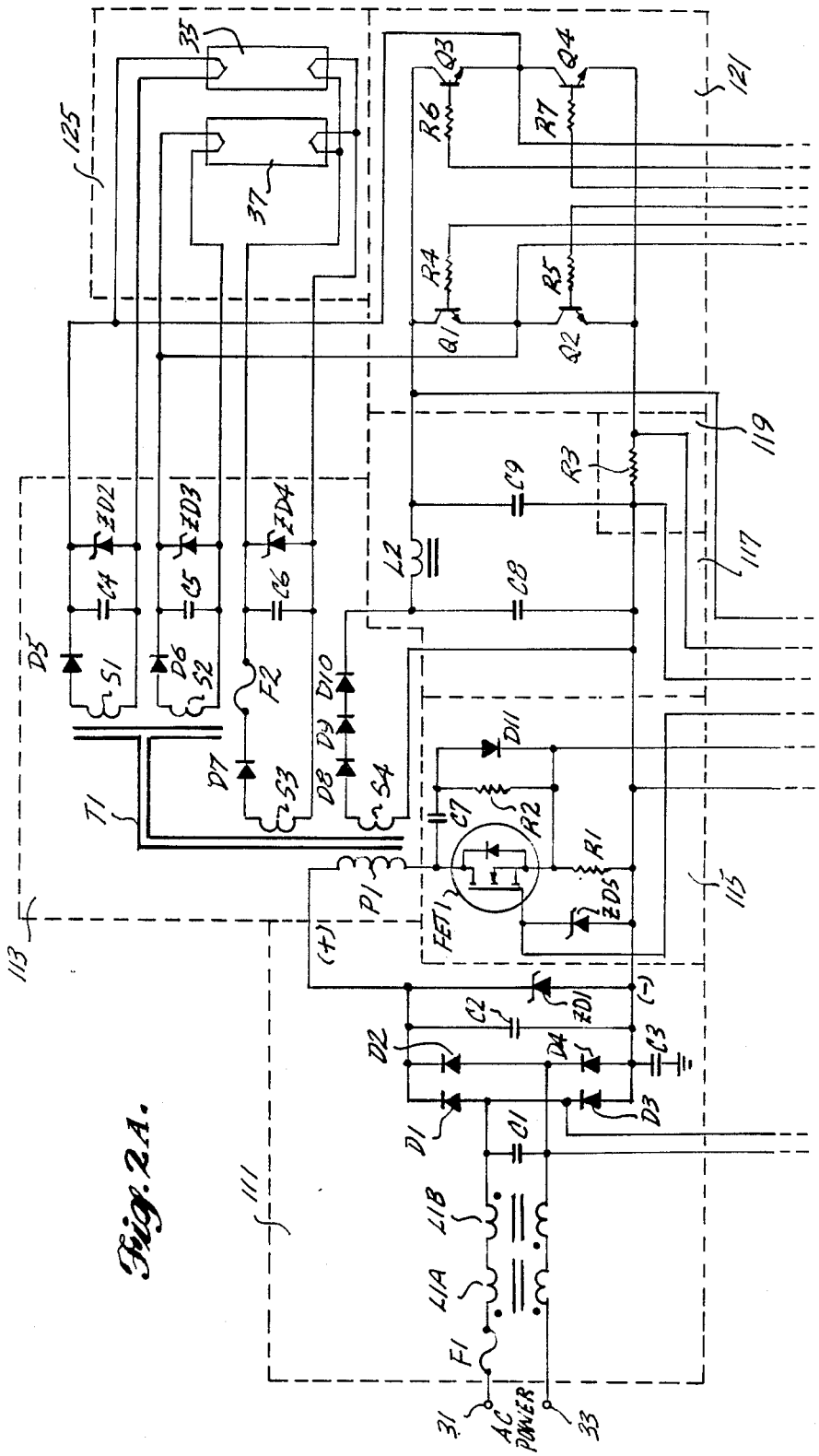
FIGS. 2A-B are schematic diagrams of an AC version of a high frequency, electronic fluorescent lamp ballast formed in accordance with the invention.

FIG. 1 illustrates, in functional block form, a high frequency, electronic fluorescent ballast formed in accordance with the invention. The fluorescent lamp ballast illustrated in FIG. 1 includes: a power supply 11; a transformer circuit 13; a switch 15; a $\pi$ filter 17; a current-to-voltage (I/V) converter 19; a commutator circuit 21; and, a control circuit 23. FIG. 1 also illustrates the fluorescent lamps 25 to be controlled by the fluorescent lamp ballast.

The power supply 11, the transformer circuit 13 and the switch 15 form a high frequency DC-to-DC flyback converter 27. More specifically, the power supply 11 receives power from a suitable AC or DC power source. In the case of AC power, the power is filtered and rectified by the power supply 11 to form pulsating DC power. In the case of DC power, the power is filtered by the power supply 11. One terminal, e.g., the positive (+) terminal of the power supply output is applied to one end of the primary winding of a flyback transformer that forms a portion of the transformer circuit 13. The other end of the primary winding of the flyback transformer is connected through the switch 15 to the other terminal, e.g., the negative (−) terminal, of the power supply 11. As a result, AC power is applied to the primary winding of the flyback transformer. The frequency of the applied power is controlled by the frequency at which the switch 15 is switched, i.e., opened and closed.

The transformer circuit 13 produces several DC outputs. Some of the outputs are connected to the filaments of the fluorescent lamps 25. One DC output applies power to the commutator circuit 21 via the $\pi$ filter 17. The current-to-voltage converter 19 is connected between the $\pi$ filter 17 and the commutator circuit 21.

The control circuit 23 receives power from the power supply 11 and feedback signals from the various sources. The feedback signals include a peak current feedback signal from the switch 15. The magnitude of the peak current feedback signal is directly and instantaneously related to the magnitude of the current flowing through the switch 15. The current-to-voltage converter 19 provides a current feedback signal whose voltage magnitude is directly related to the magnitude of the current flow between the $\pi$ filter 17 and the commutator circuit 21 and, thus, the magnitude of the current flow through the commutator circuit and through the lamps. A voltage feedback signal whose magnitude is related to the voltage applied to the commutator circuit 21 is also provided to the control circuit 23. The control circuit 23 also receives a control input(s). The control circuit produces two separate control signals—a high frequency control signal and a low frequency control signal. The high frequency control signal is applied to the switch 15 and controls the frequency at which the switch is opened and closed and, thus, the frequency of current flow through the primary winding of the transformer of the transformer circuit 13. Preferably, the frequency of the high frequency control signal is 100 kHz or above. The low frequency control signal controls current flow through the commutator circuit 21. The output of the commutator circuit is connected to the filaments of the fluorescent lamps 25 and passes the starting voltage needed to start and maintain the operation of the fluorescent lamps 25, but as AC rather than DC.

As a result of the high frequency switch rate, the size of the transformer of the flyback converter 27 is relatively small and light in weight. Because the commutator circuit is operated at a low frequency rate, electromagnetic interference is relatively low. The need for a current limiting magnetic device is eliminated because lamp current is feedback controlled via the control circuit 23 and because the discontinuous mode of operation of the flyback converter 27 tends to provide constant power. Dimming is acheived by comparing the control input(s) with the output of the current-to-voltage converter 19 and using the result to control the application of the switching signal to the switch 15. The secondary, i.e., voltage and peak current, feedback control loops limit open circuit voltage and peak switching current. More specifically, when the $\pi$ filter output voltage exceeds a predetermined level, the voltage feedback is utilized by the control circuit to override the control created by comparing the current feedback and the control input. When this occurs, the voltage feedback causes the application of the switching signal to the switch 15 to reduce the duty cycle as required to just maintain the prescribed voltage. Peak switching current control is provided by the peak current feedback output of the flyback converter 27 controlling the application of switching signals to the switch 15 on a pulse-by-pulse basis. Which signal controls in a particular situation is thus dependent upon which signal reaches its reference level first. In any event, the end result is that lamp current and open circuit voltage become virtually independent of input voltage, and frequency in the case of AC power.

In essence, the flyback converter 27 is a conversion means that includes an energy storage transformer, namely a gapped transformer that stores and discharges energy on alternate half cycles. The energy storage, e.g., gapped, transformer may be an air gap transformer or a distributed gap transformer. When current flows through the switch to charge the gap, little or no current flows through diodes connected to the secondary windings of the transformer. Conversely, when the current flow through the switch terminates, the stored energy discharges and causes a high current flow through the secondary winding diodes.

Figure 2B:
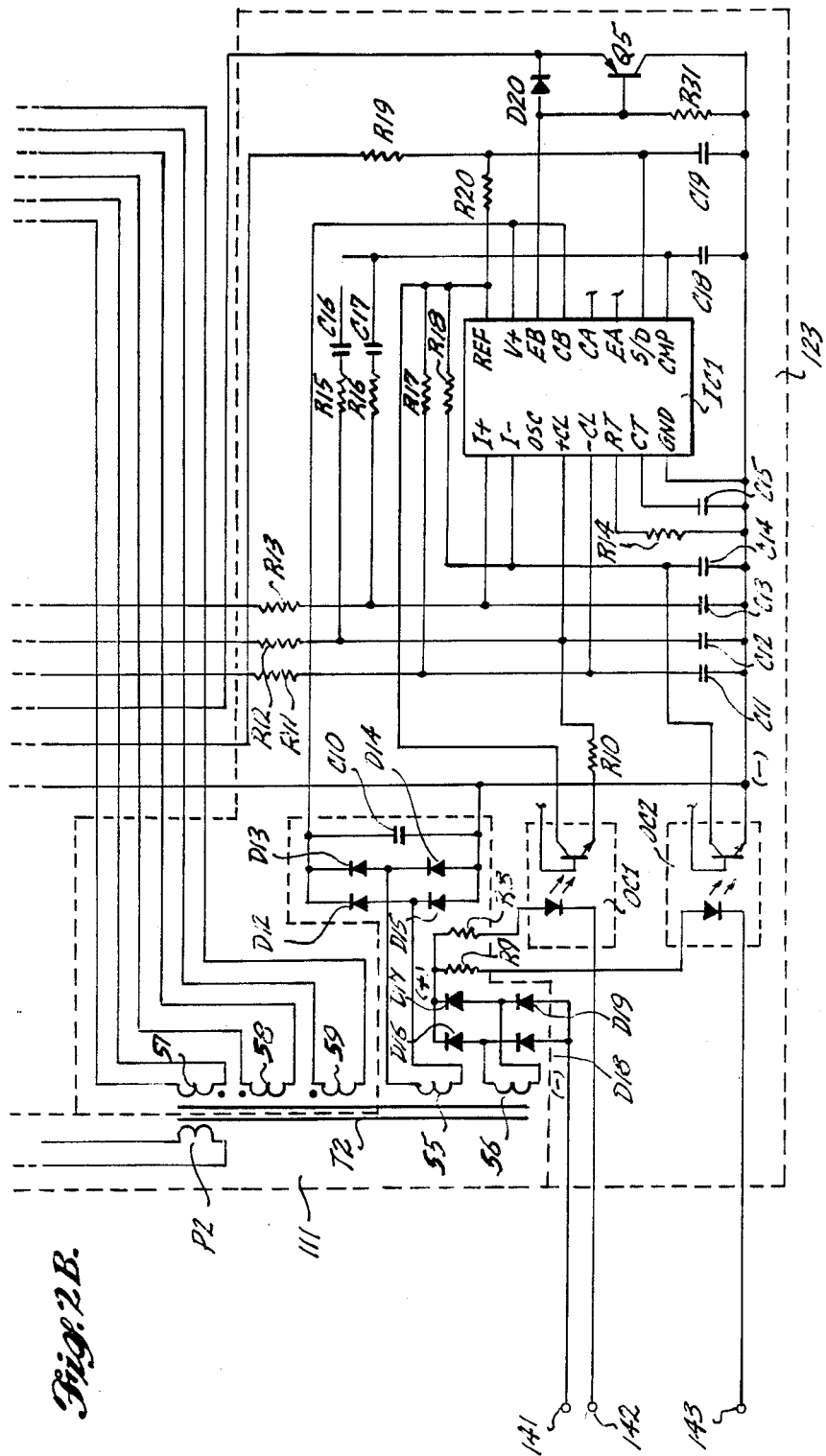

FIGS. 2A-B form a schematic diagram of a preferred embodiment of an AC version of a high frequency, electronic fluorescent lamp ballast formed in accordance with the invention. For ease of understanding, each of the functional blocks illustrated in FIG. 1 is surrounded by dashed lines in FIGS. 2A-B and referenced by the same reference number increased by one hundred. A portion of the power supply 111 is illustrated in FIG. 2A and a portion is illustrated in FIG. 2B. The portion of the power supply 111 illustrated in FIG. 2A comprises: a fuse designated F1; a pair of inductors designated L1A and L1B; three capacitors designated C1, C2 and C3; four diodes designated D1, D2, D3 and D4; and a zener diode designated ZD1. L1A comprises a pair of coupled windings wound in the same direction and L1B comprises a pair of coupled windings wound in the opposite direction.

F1 is connected between one of the AC inputs 31, and one end of series connected windings of L1A and L1B and the other AC power input 33 is connected to one end of the series connected other windings of L1A and L1B. C1 is connected across the other ends of the windings of L1B.

D1, D2, D3 and D4 are connected as a full wave bridge rectifier. More specifically, the cathodes of D1 and D2 are connected together; the anodes of D3 and D4 are connected together; the anode of D1 is connected to the cathode of D3; and, the anode of D2 is connected to the cathode of D4. The junction between one end of C1 and the windings of L1B is connected to the junction between the cathode of D1 and the anode of D3. The junction between the other end of C1 and the windings of L1B is connected to the junction between the anode of D2 and the cathode of D4. The anodes of D3 and D4 are connected through C3 to system ground. C2 is connected between the cathodes of D1 and D2 and the anodes of D3 and D4. ZD1 is connected in parallel with C2 such that the cathode of ZD1 is connected to the cathodes of D1 and D2 and the anode of ZD1 is connected to the anodes of D3 and D4.

In operation, the bridge formed by D1, D2, D3 and D4 rectifies the filtered AC signal formed across C1. The rectified signal is filtered a small amount by C2 which, preferably, provides only a small holdup in order to maximize the power factor of the system. The voltage on C2 is limited by ZD1. The positive (+) output of the resulting lamp power supply is formed at the junction of the cathodes of D1, D2 and ZD1 and the negative (−) output is formed at the junctions of the anodes of D3, D4 and ZD1.

The transformer circuit 113 of the high frequency, electronic fluorescent lamp ballast illustrated in FIGS. 2A-B comprises: an energy storage flyback transformer designated T1; six diodes designated D5 through D10; three capacitors designated C4, C5 and C6; three zener diodes designated ZD2, ZD3 and ZD4; and a fuse designated F2. T1 has a primary winding designated P1 and four secondary windings designated S1, S2, S3 and S4. Preferably, the core of T1 is multi-legged—it may be an EE core or a pot core, for examples. Thus, the core includes a center leg that is common to two magnetic paths defined by side legs. S1 and S2 are each wound about one of the side legs and P1, S3 and S4 are wound about the center leg.

One end of P1 is connected to the positive (+) output of the lamp power supply. The other end of P1 is connected to the switch 115 in the manner hereinafter described. S1, S2 and S3 supply filament power to a pair of fluorescent lamps 35 and 37. More specifically, one end of S1 is connected to the anode of D5. The cathode of D5 is connected through C4 to the opposite side of S1. ZD2 is connected in parallel with C4 such that the cathode of ZD2 is connected to the cathode of D5. The junction between the cathodes of D5 and ZD2 and one end of C4 is connected to one end of one of the filaments of one of the lamps 35. The other end of the same filament is connected to the junction between the anode of ZD2, C4 and S1. Similarly, the anode of D6 is connected to one side of S2. The cathode of D6 is connected to the other side of S2 through C5. ZD3 is connected in parallel with C5 such that the cathode of ZD3 is connected to the cathode of D6. The junction between D6, C5 and ZD3 is connected to one end of one of the filaments of the other lamp 37. The other end of the same filament is connected to the junction between ZD3, C5 and S2. One end of S3 is connected to the anode of D7. The cathode of D7 is connected through F2 in series with C6 to the other end of S3. ZD4 is connected in parallel with C6 such that the cathode of ZD4 is connected to the junction between F2 and C6. The junction between F2, C6 and ZD4 is connected to one end of the other filaments of both of the fluorescent lamps 35 and 37. The other end of the filaments is connected to the junction between ZD4, C6 and S3.

One end of S4 is connected to the anode of D8; and, the cathode of D8 is connected to the anode of D9. The cathode of D9 is connected to the anode of D10. The cathode of D10 and the other end of S4 are connected to the π filter 117 in the manner hereinafter described.

As noted above, preferably S1 and S2 are wound around opposite side legs of T1. Such an arrangement has the benefit of providing filament short circuit protection because when one filament shorts, the magnetic flux in the core legs force current matching. This limits the maximum current to that of the nonshorted filament. D5-D10 rectify the voltages produced on their respective secondary windings, S1 through S4. C4, C5 and C6 filter the voltages that are rectified by D5, D6 and D7. ZD2, ZD3 and ZD4 limit the voltages stored by C4, C5 and C6; and, thus, limit the voltages applied to the filaments of the fluorescent lamps 35 and 37.

The switch 115 of the high frequency, electronic fluorescent lamp ballast illustrated in FIGS. 2A-B comprises: an N-type enhancement MOSFET designated FET 1; a zener diode designated ZD5; two resistors designated R1 and R2; a capacitor designated C7; and, a diode designated D11. The gate of FET 1 is connected to the cathode of ZD5. The gate of FET 1 is also connected to the control circuit 123 (FIG. 2B) to receive the high frequency switch control signals that control the opening and closing of the switch 115. The anode of ZD5 is connected to the negative (−) output of the power supply 111. The other side of the primary winding, P1, of the flyback transformer, T1, is connected to the drain terminal of FET 1. The source and substrate terminals of FET 1 are connected through R1 to the negative (−) output of the power supply 111. C7 and R2 are connected in series between the source and drain terminals of FET 1. D11 is connected in parallel with R2 such that the anode of D11 is connected to the junction between C7 and R2.

As a result of its connection to the control circuit 123, FET 1 forms a switch that rapidly switches the output of the lamp power supply through P1 when the high frequency gating signal is applied to the gate of FET 1. When no gating signal is applied to FET 1, FET 1 prevents current flow through P1. Current flow through FET 1, sensed at the junction of R2 and the source terminal of FET 1, is applied to an input of the hereinafter described control circuit 123.

The π filter 117 of the high frequency, electronic fluorescent ballast illustrated in FIGS. 2A-B comprises: two capacitors designated C8 and C9; and, an inductor designated L2. The cathode of D10 of the flyback transformer circuit 113 is connected to one end of L2 and one end of C8. The other end of C8 is connected to the negative (−) output of the lamp power supply. C9 is connected between the negative (−) output of the lamp power supply and the other end of L2. As a result, C8, C9 and L2 form a classic π filter. Preferably, the values of C8, L2 and C9 are chosen to allow a fast rise time after current reversal in order to provide rapid starting of the fluorescent lamps 35 and 37, which are connected to the output of the π filter 117 through the commutator circuit 121 in the manner hereinafter described. Further, preferably, the values of C8, L2 and C9 are chosen to have low energy storage.

The current-to-voltage converter 119 of the high frequency, electronic fluorescent ballast illustrated in FIGS. 2A-B comprises: a signal resistor designated R3 having one end connected to the negative (−) output of the lamp power supply. The other end of R3 is connected to the commutator circuit 121 in the manner hereinafter described. The ends of R3 are also connected to the hereinafter described control circuit 123 (FIG. 2B). Since R3 is connected in series with the output of the π filter, the voltage drop across R3 is directly related to the current flow through the commutator circuit 121 and, thus, through the fluorescent lamps.

The commutator circuit 121 of the high frequency, electronic fluorescent ballast illustrated in FIGS. 2A-B is a bridge circuit that comprises: four NPN transistors designated Q1, Q2, Q3 and Q4; and, four resistors designated R4, R5, R6 and R7. The junction between L2 and C9 of the π filter 117 is connected to the collectors of Q1 and Q3. The emitter of Q1 is connected to the collector of Q2 and the emitter of Q3 is connected to the collector of Q4. The output end of the current-to-voltage converter 119 is connected to the emitters of Q2 and Q4. The junction between the emitter of Q1 and the collector of Q2 is connected to one of the filaments of one of the lamps 37, namely the filament connected to S2 of T1. The junction between the emitter of Q3 and the collector of Q4 is connected to one of the filaments of the other lamp, namely the filament connected to S1. One end of R4 is connected to the gate of Q1; one end of R5 is connected to the gate of Q2; one end of R6 is connected to the gate of Q3; and, one end of R7 is connected to the gate of Q4. The other ends of R4, R5, R6 and R7 and the junctions between the emitter of Q1 and the collector of Q2 and the emitter of Q3 and the collector of Q4 are all connected to the control circuit 123 in the manner hereinafter described.

As will be better understood from the following description of the control circuit 123, the control circuit produces switching signals that cause Q1 and Q2 to be in opposite states and that cause Q3 and Q4 to be in opposite states. Further, the switching signals cause Q1 and Q3 to be in opposite states. More specifically, when Q1 is off, Q2 is on, whereby a low voltage is present on the junction between Q1 and Q2. Simultaneously, Q3 is on and Q4 is off, whereby a high voltage is applied to the filament connected to the junction between the emitter of Q3 and the collector of Q4. Conversely, when Q1 is on, Q2 is off, whereby a high voltage is complied to the filament connected to the junction between the emitter of Q1 and the collector of Q2. Simultaneously, Q3 is off, and Q4 is on, whereby a low voltage is applied to the filament connected to the junction between the emitter of Q3 and the connector of Q4.

The portion of the power supply 111 illustrated in FIG. 2B comprises: a power transformer designated T2; eight diodes designated D12 through D19; a capacitor designated C10; and, two resistors designated R8 and R9. T2 includes a primary winding designated P2 and five secondary windings designated S5 through S9. P2 is connected in parallel with C1 (FIG. 2A). S5 and S6 supply power to two full wave bridge rectifiers formed by D12 through D19. More specifically, one end of S5 is connected to the anode of D12 and to the cathode of D15. The other end of S5 is connected to the anode of D13 and to the cathode of D14. The cathodes of D12 and D13 are connected together, and the anodes of D14 and D15 are connected together. C10 is connected between the cathodes of D12 and D13 and the anodes of D14 and D15. Thus, D12 through D15 and C10 form a DC power supply whose positive (+) output is at the junction of D12, D13 and C10 and whose negative (−) output is at the junction of D14, D15 and C10. The negative (−) output of the D12–D15 and C10 power supply is connected to the negative (−) output of the lamp power supply formed by D1–D4, C2 and ZD1 illustrated in FIG. 2A and described above.

One end of S6 is connected to the anode of D16 and the cathode of D18. The other end of S6 is connected to the anode of D17 and the cathode of D19. The cathodes of D16 and D17 are connected together. The anodes of D18 and D19 are also connected together. Thus, D16, D17, D18 and D19 form a DC power supply having an unfiltered output. The positive (+) output of this power supply, formed at the cathode of D16 and D17, is connected to one end of each of R8 and R9. The negative (−) output, formed at the anodes of D18 and D19, is connected to a first control input 141.

As will be understood from the following description, the filtered power supply formed by D12–D14 and C10 supplies power to an integrated circuit that forms a portion of the hereinafter described control circuit 123. The unfiltered power supply formed by D16–D19 supplies power to a pair of optical couplers that also form a portion of the control circuit 123.

The other three secondary windings S7, S8 and S9 of T2 form a portion of the control circuit 123. More specifically, these secondary windings are connected to the commutator circuit 121 and provide the control signals that control the states of Q1 through Q4. Because the polarity as well as the magnitude of the control signals applied to the gates of Q1 through Q4 determine the states of Q1 through Q4, dot notation indicating the direction of the windings and, thus, the instantaneous polarity relationship of the S7, S8 and S9 voltages is illustrated in FIG. 2B and used in the following description.

The nondot end of S7 is connected to the junction between the emitter of Q1 and the collector of Q2. The dot end of S7 is connected through R4 to the gate of Q1. The dot end of S8 is connected through R5 to the gate of Q2. The nondot end of S8 is connected through R7 to the gate of Q4. The dot end of S9 is connected through R6 to the gate of Q3, and the nondot end of S9 is connected to the junction between the emitter of Q3 and the collector of Q4. As a result, Q1, Q2, Q3 and Q4 are switched on and off in the relative manner described above.

In addition to S7, S8 and S9, the control circuit 123 includes: a regulating pulse width modulator integrated circuit designated IC1; two electro-optical couplers designated OC1 and OC2; fourteen resistors designated R8 through R21; nine capacitors designated C11 through C19; a diode designated D20; and, a PNP transistor designated Q5.

While various types of regulating pulse width modulator integrated circuits could be utilized with the embodiment of the invention illustrated in FIGS. 2A–B, the presently preferred regulating pulse width modulator integrated circuit is the UC1524A produced by Unitrode Corporation, Lexington, Mass. 02173. This particular linear integrated circuit includes sixteen terminals, all of which are illustrated in FIG. 2B, even though some are not utilized. The illustrated terminals include: an inverting input, designated I+; a noninverting input designated I−, an oscillator terminal designated OSC; a positive sense terminal designated +CL; a negative sense terminal designated −CL; resistor and capacitor timing terminals designated RT and CT, respectively; a ground terminal designated GND; a reference voltage terminal designated REF; a power supply terminal designated V+; a first pair of emitter and collector terminals designated EB and CB; a second pair of emitter and collector terminals designated EA and CA; a shutdown terminal designated S/D; and, a compensation terminal designated CMP. I+ and I− are input terminals connected to a first error amplifier; and +CL and −CL are input terminals connected to a second error amplifier. OSC is the output of an internal oscillator whose frequency is determined by the resistor and capacitor values connected between RT and CT, and ground, respectively. In accordance with the invention, the preferred oscillation frequency is 200 kHz or above, since the preferred output frequency is about 100 kHz or above and the oscillator operates at twice the output frequency. REF is a regulated voltage reference output terminal. EB and CB, and EA and CA, are pairs of output terminals, each pair connected to the emitter and collector of an output transistor. S/D is a shutdown input terminal that disables the EB/CB and EA/CA outputs when a suitable voltage is applied. CMP is a compensation output whose voltage is based on the outputs of the I+/I− and +CL/−CL error amplifiers.

The positive (+) output of the filtered power supply, i.e., the voltage at the cathodes of D12 and D13, is applied to the V+ and CB terminals of IC1. The positive (+) output of the unfiltered power supply, i.e., the voltage at the cathodes of D16 and D17, is applied through R8 to the anode of the light emitting diode of OC1 and through R9 to the anode of the light emitting diode of OC2. The cathode of the light emitting diode of OC1 is connected to a second control input 142 and the cathode of the light emitting diode of OC2 is connected to a third control input 143. As a result, when the second control input 142 is connected to the first control input 141, the light emitting diode of OC1 emits light and when the third control input 143 is connected to the first control input 141, the light emitting diode of OC2 emits light.

The voltage at the junction between R1 and the source terminal of FET 1 of the switch 115 is connected through R19 in series with C19 to the negative (−) output of the filtered power supply. The junction between R19 and C19 is connected through R20 to the REF terminal of IC1. The junction between R19 and C19 is also connected to the shutdown (S/D) terminal of IC1. The gate of FET 1 is connected to the emitter of Q5. The collector of Q5 is connected to the negative (−) output of the filtered power supply. The emitter of Q5 and, thus, the gate of FET 1 is also connected to the cathode of D20. The anode of D20 is connected to the EB terminal of IC1. The EB terminal of IC1 is also connected through R21 to ground and to the gate of Q5. As a result, Q5 in combination with D20 and R21 form a gate drive booster amplifier that applies the EB output of IC1 to the gate of FET 1.

The end of the current-to-voltage converter 119 connected to the π filter 117 is connected through R11 in series with C11 to the negative (−) output of the filtered power supply. The junction between R11 and C11 is connected through R17 to the REF terminal of IC1. The junction between R11 and C11 is also connected to the −CL terminal of IC1. The end of the current-to-voltage converter 119 connected to the commutator circuit 121 is connected through R12 in series with C12 to the negative (−) output of the filtered power supply. The junction between R12 and C12 is connected through R15 in series with C16 to the CMP terminal of IC1. The CMP terminal of IC1 is also connected through C18 to the negative (−) output of the filtered power supply. The junction between R12 and C12 is also connected to the +CL terminal of IC1 and through R10 to the emitter terminal of the phototransistor of OC1. The collector terminal of the phototransistor of OC1 is connected to the REF terminal of IC1.

Since +CL and −CL are connected to the inputs of an error amplifier that forms a part of IC1, the magnitude of the output of the error amplifier is related to the magnitude of the voltage drop across R3 conditioned by OC1 and R10. The magnitude of the voltage drop across R3 is directly related to the current flow through R3; and, the state of OC1 determines whether R10 is connected to or disconnected from the REF terminal of IC1. If R10 is connected to the REF terminal, the REF output of IC1 contributes a reference value to the +CL terminal of IC1 and if R10 is not connected to the +REF terminal IC1 the REF output does not contribute a reference value to the +CL terminal of IC1. Thus, OC1 forms a step control. If the photodiode of OC1 is not emitting light, a large voltage drop across R3 is required to cause the output of the +CL/−CL error amplifier to stabilize.

Contrariwise, if the photodiode of OC1 is emitting light, a smaller voltage drop across R3 is required to cause the output of the +CL/−CL error amplifier to stabilize. Since the state of OC1 is controlled by the connection between the first and second control inputs 141 and 142, these control inputs control the reference voltage applied to the +CL terminal of IC1. As will be better understood from the following discussion, the reference voltage controls the intensity of light emitted by the fluorescent lamps 35 and 37. Obviously, rather than using a photo coupler such as OC1 and a step approach, OC1 could be replaced with a controllable, variable resistance device to provide an embodiment of the invention having the ability to control the reference voltage and, thus, light intensity over a range.

The voltage output of the π filter, i.e., the voltage at the junction between L2 and C9, is applied through R13 in series with C13 to the negative (−) output of the filtered power supply. The junction between R13 and C13 is connected through R16 in series with C17 to the CMP terminal of IC1. The junction between R13 and C13 is also connected to the I+ terminal of IC1. The I− terminal of IC1 is connected through R18 to the REF terminal of IC1 and through R14 to the negative (−) output of the filtered power supply.

The emitter terminal of the phototransistor of OC2 is connected to the negative (−) output of the filtered power supply; and, the collector terminal of the phototransistor of OC2 is connected to the I− terminal of IC1. Thus, the I+ terminal of IC1 senses the voltage applied to the commutator circuit 121. The IC1 error amplifier connected to the I+ and I− terminals of IC1 compares the bridge input voltage with the reference voltage stored by C14, when the photodiode of OC2 is not emitting light. If the bridge input or open circuit voltage rises above the reference level set by C14, the output of the associated IC1 error amplifier stabilizes as required to just maintain the prescribed open circuit voltage. As will be better understood from the following description, this action reduces the duty cycle of the switch pulses applied to FET 1. OC2 provides a shutdown input that forces the output of the I+/I− error amplifier to saturate to the state that causes zero duty cycle (i.e., off) switch pulses to be applied to FET 1. More specifically, when the third control input 143 is connected to first control input 141, light is emitted by the photodiode of OC2. As a result, the phototransistor of OC2 conducts and shorts the voltage on C14. This results in the output of the I+/I− error amplifier saturating and terminating the application of switch pulses to FET 1, as described more fully below.

The RT terminal of IC1 is connected through R14 and the CT terminal is connected through C15 to the negative (−) output of the filtered power supply. The time constant determined by the values of R14 and C15 determines the frequency of oscillation of the internal oscillator of IC1. As noted above, IC1 includes two error amplifiers. The inputs of one error amplifier are connected to the I+ and I− terminals of IC1 and the inputs of the other error amplifier are connected to the +CL and −CL terminals of IC1. The error amplifier outputs control the application of pulses produced by the IC1 oscillator to the EB terminal of IC1 in a pulse width modulated manner. That is, either error amplifier output can control the width of the period during which oscillator pulses are applied to the gate of FET 1. As long as the voltage input of the commutator circuit remains low, the commutator circuit current flow controls the width of the pulse application period. In this case, the width is also determined by the reference voltage determined by the state of OC1, as described above. As a result, the light emitted by the fluorescent lamps is controlled in a single stepwise manner by the first and second control inputs 141 and 142.

If the input voltage of the commutator circuit exceeds the level set by the reference voltage on C14 (assuming that the photodiode of OC2 is not emitting light), the width of the pulse application period becomes controlled by the output of the +I/−I error amplifier. This control prevents the voltage limits of the commutator circuit components from being exceeded. If the photodiode of OC2 is conducting, the I+/I− error amplifier also controls. In this instance, the system is turned off because no oscillator pulses are applied to FET 1.

Finally, if the magnitude of the pulses applied to the S/D terminal of IC1 exceed a prescribed level, the pulse switching FET 1 on is instantaneously terminated. As a result, the magnitude of the peak current through FET 1 is limited on a pulse-by-pulse basis. This prevents the limits of FET 1 from being exceeded.

Consequently, the EB terminal output is a pulse width modulated signal that fluctuates back and forth at a clock rate determined by the value of the components connected to the RT and CT inputs of IC1. The pulse width modulated signal produced at the EB terminal of IC1 is amplified by the gate drive booster amplifier formed by D20, R21 and C5 prior to being applied to the gate of FET 1.

As will be readily appreciated from the foregoing description, the high frequency, electronic fluorescent lamp ballast illustrated in FIGS. 2A-B functions in the manner depicted in FIG. 1 and described above. The control inputs determine the intensity of the light emitted by the lamps 35 and 37. Full brightness occurs when neither control input 142 or 143 is connected to control input 141. In this case, maximum current flow through R3 is required before the amplifier connected to +CL/−CL error terminates the application of oscillator pulses to the EB terminal of IC1. If control input 142 is connected to control input 141, a lower current flow through R3 causes control loop stabilization. Thus, the fluorescent lamps emit less light. As noted above, rather than being controlled in a step manner, dimming can be adjustable over a range by eliminating OC1 and providing a variable control between the first and second control inputs 141 and 142.

Figure 3A:
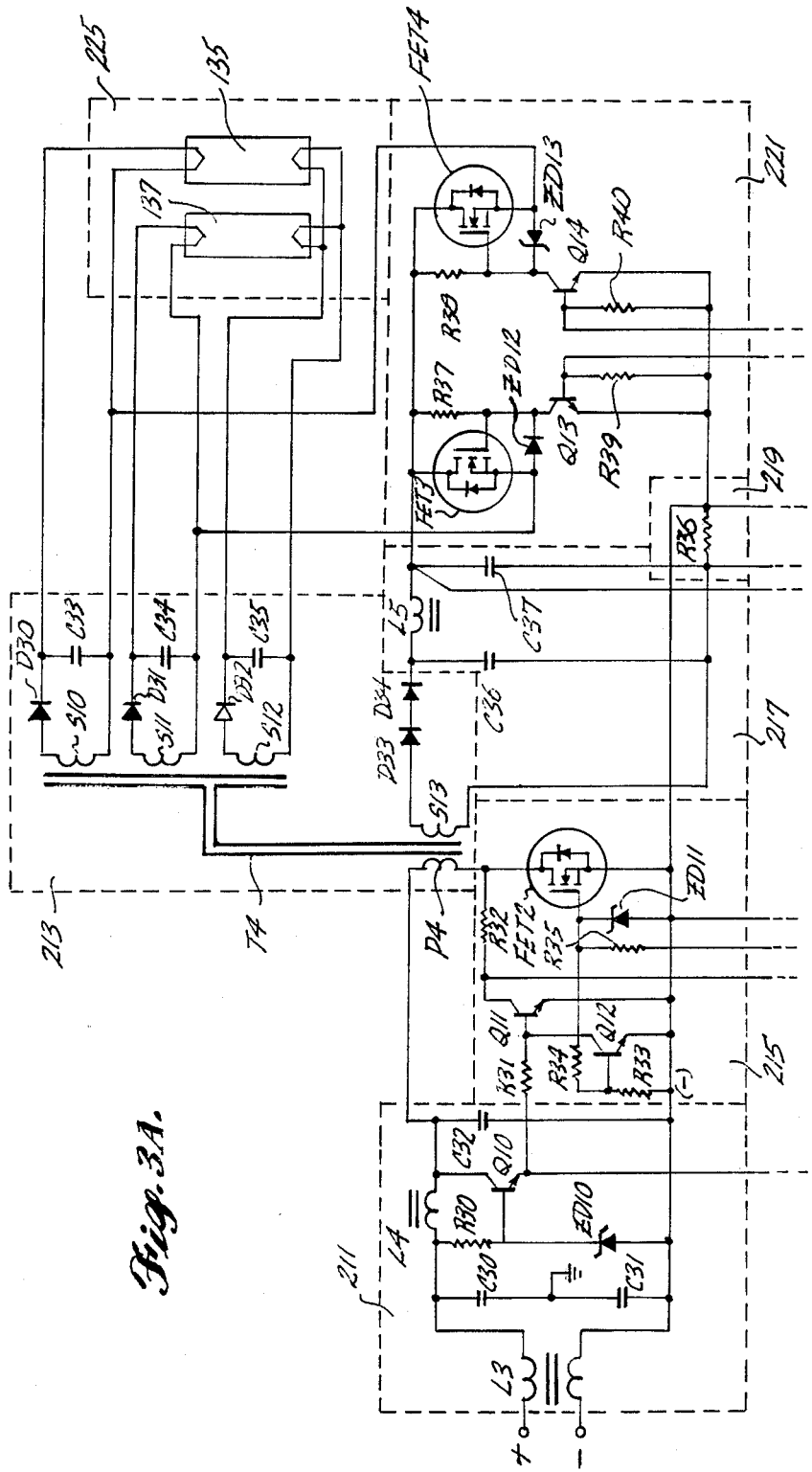
FIGS. 3A-B are schematic diagrams of a DC version of a high frequency, electronic fluorescent lamp ballast formed in accordance with the invention.
Figure 3B:
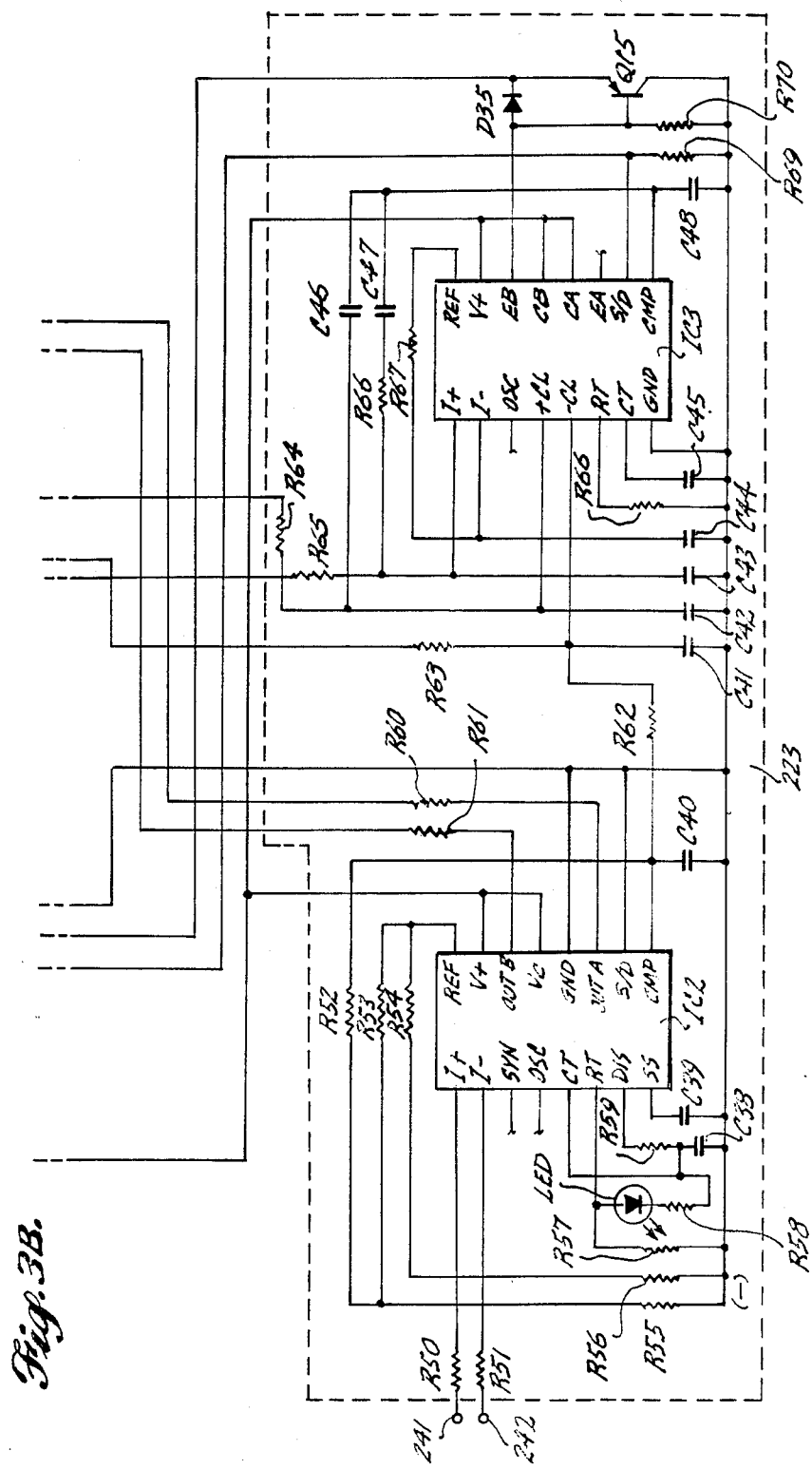

FIGS. 3A-B illustrate a DC embodiment of a high frequency, electronic fluorescent lamp ballast formed in accordance with the invention. As with the embodiment illustrated in FIGS. 2A-B, the portions of FIGS. 3A-B that correspond to the functional block diagram illustrated in FIG. 1 are outlined in dashed line form. Further, the reference numerals are the same with the addition of a two hundred increment. Thus, power supply reference 11 in FIG. 1 corresponds to power supply reference 211 in FIG. 3A.

The power supply 211 illustrated in FIG. 3A comprises: a dual coil line filter inductor designated L3; a regulator filter inductor designated L4; three capacitors designated C30, C31 and C32; a zener diode designated ZD10; and, an NPN transistor designated Q10. The positive terminal of the DC power applied to the power supply 211 is connected to one end of one of the coils of L3 and the negative terminal is connected to one end of the other L3 coil. C30 and C31 are connected in series across the other ends of the L3 coils. The junction between C30 and C31 is connected to ground. The junction between L3 and C30 is connected through R30 to the gate of Q10. The gate of Q10 is also connected to the cathode of ZD10. The anode of ZD10 is connected to the junction between L3 and C31. L4 is connected between the junction between C30 and R30 and the collector of Q10. The emitter of Q10 is connected to the power inputs of integrated circuits that form part of the control system illustrated in FIG. 3B and described below. C32 is connected between the junction between L4 and the collector of Q10, and the junction between L3, C31 and the anode of ZD10. In essence, ZD10, R30, L4 and Q10 form a power supply regulator circuit that regulates the DC power applied to the power supply. A regulated positive (+) lamp supply output of the regulator is formed at the junction between L4, C32 and the collector of Q10 and the negative (−) output is formed at the junction between C32, C31 and the anode of ZD10.

The transformer circuit 213 of the high frequency, electronic fluorescent lamp ballast illustrated in FIGS. 3A-B comprises: an energy storage transformer designated T4; five diodes designated D30 through D34; and, three capacitors designated C33, C34 and C35. T4 has a multi-legged magnetic core, such as an EE core or a pot core, about which is coiled a primary winding designated P4 and four secondary windings designated S10, S11, S12 and S13. S10 and S11 are wound about one of the outside legs of the core of T4 and S12 is wound about the other outside leg. P4 and S13 are wound about the center leg of the core of T4.

The positive (+) lamp supply output of the regulator, i.e., the junction between L4, the collector of Q10 and C32, is connected to one end of the primary winding, P4, of T4. The other end of P4 is connected to the switch 215 in the manner hereinafter described. The anode of D30 is connected to one end of S10. The cathode of D30 is connected through C33 to the other end of S10. The filament on one end of one of a pair of fluorescent lamps 35 is connected in parallel with C33. One end of S11 is connected to the anode of D31. The cathode of D31 is connected through C34 to the other end of S11. The filament at one end of the other fluorescent lamp 37 is connected in parallel with C34. One end of S12 is connected to the anode of D32. The cathode of D32 is connected through C35 to the other end of S12. The filaments at the other end of the fluorescent lamps 35 and 37 are connected in parallel with C35. As will be readily appreciated from this description and viewing FIG. 3A, windings S10, S11 and S12 in combination with D30, D31 and D32 and C33, C34 and C35 apply rectified power to the filaments of the fluorescent lamps 35 and 37.

One end of S13 is connected to the anode of D33. The cathode of D33 is connected to the anode of D34. The cathode of D34 and the other end of S13 are connected to the inputs of the π filter 217, in the manner described below.

The switch 215 of the high frequency, electronic fluorescent lamp ballast illustrated in FIGS. 3A-B comprises: an N-type enhancement MOSFET designated FET 2; two NPN transistors designated Q11 and Q12; a zener diode designated ZD11; and, five resistors designated R31 through R35. The emitter of Q10 of the power supply 211 is connected through R31 to the gate of Q11. The collector of Q11 is connected through R32 to the other end of the primary winding, P4, of T4 of the transformer circuit 213. The emitter of Q11 is connected to the negative (−) output of the power supply 211. The negative (−) output of the power supply 211 is also connected through R33 in series with R34 to the gate of FET 2. The junction between R33 and R34 is connected to the gate of Q12. The collector of Q12 is connected to the gate of Q11 and the emitter of Q12 is connected to the negative (−) output of the power supply 211. The drain terminal of FET 2 is connected to the other end of the P4 of T4. The substrate and source terminals of FET 2 are connected to the negative (−) output of the power supply 211. The cathode of ZD11 is connected to the gate of FET 2 and the anode of ZD11 is connected to the negative (−) output of the power supply 211. The junction between the collector Q11 and R32 is connected to the control circuit 223 in the manner hereinafter described. The junction between R34 and the gate of FET 2 is connected through R35 to the control circuit 223, also in the manner hereinafter described.

The circuit formed by R31, R32, R33, R34, Q11 and Q12 is a protection circuit for FET 2. This circuit performs a similar function to that of R2 of FIG. 2A. The output of the circuit is a voltage analog of the current flowing through FET 2. The circuit functions by allowing the saturation drop of FET 2 to pass as the current sense output when FET 2 is gated on and conversely by clamping the output to ground when FET 2 is gated off. More specifically, when gate voltage is applied to FET 2, Q12 turns on which consequently turns Q11 off. The saturation drop of FET 2 is now allowed to pass to the control circuit through R32 as an analog of FET 2 current. The waveform is representative of FET 2 current because of the resistive on-characteristic of a MOSFET. When the gate drive is removed, Q12 turns off allowing Q11 to turn on. With Q11 turned on, the output is clamped to (substantially) ground, blocking the drain voltage, which is no longer representative of the FET 2 current. In essence, the on-resistance of FET 2 is the current sense resistor. The benefits of this scheme over a simple resistor are: zero sensor voltage drop because no series device is used (especially useful in low input voltage systems) and intrinsic thermal limiting due to the positive temperature coefficient of power MOSFETs. Protection against poor gate drive due to low input voltage is also provided. The output at the junction of Q11 and R32 is used by the control circuit 223 to control the operation of FET 2 in the manner described below.

The π filter 217 of the high frequency, electronic fluorescent lamp ballast illustrated in FIGS. 3A–B comprises: a pair of capacitors designated C36 and C37; and, an inductor designated L5. The cathode of D34 of the transformer circuit 213 is connected to one end of C36 and to one end of L5. The other end of L5 is connected to one end of C37. The other ends of C36 and C37 are connected to the other end of S13. As with the AC embodiment of the invention illustrated in FIGS. 2A–B, the values of the π filter components (e.g., C36, C37 and L5) of the DC embodiment should be chosen to allow a fast rise time for starting after a half cycle to half cycle current reversal. The voltage of the junction between L5 and C37, i.e., the bridge input voltage, is applied to the control circuit and used in the manner described below.

The current-to-voltage converter 219 of the high frequency, electronic fluorescent lamp ballast illustrated in FIGS. 3A–B comprises a resistor designated R36. The junction between C36, C37 and S13 is connected to one end of R36. The other end of R36 is connected to the negative (−) output of the power supply 211. The ends of R36 are also connected to the control circuit to provide a voltage signal whose magnitude is related to the current flow through R36 and, thus, the current flow to the commutator circuit 221.

The commutator circuit 221 of the high frequency, electronic fluorescent lamp ballast illustrated in FIGS. 3A–B is a bridge circuit that comprises: two N-type enhancement MOSFETs designated FET 3 and FET 4; two NPN transistors designated Q13 and Q14; two zener diodes designated ZD12 and ZD13; and, four resistors designated R37, R38, R39 and R40. The junction between L5 and C37 is connected to the drain terminals of FET 3 and FET 4. R37 is connected between the drain terminal of FET 3 and the gate terminal of FET 3. R38 is connected between the drain terminal of FET 4 and the gate terminal of FET 4. The source and substrate terminal of FET 3 is connected to the anode of ZD12 and to a filament of one of the lamps 137, namely the filament connected to S11, C34 and D31. The cathode of ZD12 is connected to the gate of FET 3 and to the collector of Q13. The anode of ZD13 is connected to the source and substrate terminal of FET 4 and to a filament of the other lamp 135, namely the filament connected to S10, C33 and D30. The cathode of ZD13 is connected to the gate of FET 4 and to the collector of Q14. The gate of Q13 is connected through R39 to the emitter of Q13. The emitter of Q13 is also connected to the negative (−) output of the power supply 211. R40 is connected between the gate and the emitter of Q14. The emitter of Q14 is also connected to the negative (−) output of the power supply 211. Commutator circuit control signals produced by the control circuit 223 in the manner hereinafter described are applied to the gates of Q13 and Q14.

In operation, as will be better understood from the following description of the control circuit 223, opposite polarity signals are applied to Q13 and Q14. Consequently, Q13 is on when Q14 is off and vice versa. Further, when Q13 is on, FET 3 is off and vice versa. Finally, when Q14 is on, FET 4 is off and vice versa. More specifically, when Q13 is turned on by a suitable control signal, the FET 3 is turned off as a result of the gate of FET 3 being pulled low by Q13. Simultaneously, FET 4 is turned on as the result of Q14 being turned off. ZD13 limits the gate voltage of FET 4. The opposite situation exists when the opposite polarity control voltages are applied to Q13 and Q14. Further, when Q13 is off and FET 13 is on, a high starting voltage is applied to the filament connected through ZD12 to the collector of Q3. At the same time, a low (substantially) zero voltage is applied to the filament connected through ZD13 to the collector of Q14. Conversely, when Q14 is off and FET 14 is on, a high starting voltage is applied to the filament connected through ZD13 to the collector of Q14. At the same time, the low (substantially) zero voltage is applied to the filament connected through ZD12 to the collector of Q13.

The control circuit 223 of the high frequency, electronic fluorescent lamp ballast illustrated in FIGS. 3A-B comprises: a light emitting diode designated LED; two integrated circuits designated IC2 and IC3; twenty-one resistors designated R50 through R70; eleven capacitors designated C38 through C48; a diode designated D35; and, a PNP transistor designated Q15. IC3 is a regulating pulse modulator integrated circuit, preferably of the type utilized to form IC1 of the AC embodiment of the invention illustrated in FIGS. 2A-B and described above. Since the terminals of this IC are described above, they are not set forth here. IC2 is a pulse width modulated switching regulator integrated circuit, preferably a UC1525A produced by Unitrode Corporation, Lexington, Mass. 02173. The UC1525A produced by Unitrode has sixteen terminals, all of which are illustrated in FIG. 3B and described below, even though a couple are unconnected and, thus, not utilized.

The illustrated IC2 terminals include: inverting and noninverting terminals designated I+ and I−; a synchronizing terminal designated SYN; an oscillator terminal designated OSC; resistor and capacitor terminals designated CT and RT, which control the frequency of oscillation of an internal oscillator; a discharge terminal designated DIS; a soft start terminal designated SS; a compensation terminal designated CMP; a shutdown terminal designated S/D; first and second output terminals designated OUTA and OUTB, which produce nonoverlapping pulses; a ground terminal designated GND; a voltage terminal designated VC; a power supply terminal designated V+; and, a reference voltage terminal designated REF. The I+ and I− terminals are connected to an error amplifier whose output controls the width of the nonoverlapping pulses that are produced at OUTA and OUTB. The resistance and capacitance values connected to RT and CT control the frequency of the pulses by controlling the frequency of oscillation of an internal IC2 oscillator. The magnitude of the pulses is controlled by the voltage applied to VC.

A pair of control inputs 241 and 242 connected to a suitable DC differential control source are connected to the I+ and I− terminals of IC2. More specifically, the first control input 241 is connected through R50 to the I+ terminal and the second control input 242 is connected through R51 to the I− terminal. The REF terminal of IC2 is connected through R53 in series with R55 to the negative (−) output of the power supply. The REF terminal is also connected through R54 in series with R56 to the negative (−) output of the power supply. The junction between R53 and R55 is connected to the I+ terminal of IC2 and the junction between R54 and R56 is connected to the I− terminal of IC2. Thus, R53 and R55, and R54 and R56 form voltage dividers that supply reference voltages to the I+ and I− terminals of IC2.

The junction between R53 and R55 is also connected through R52 to the CMP terminal of IC2. The CMP terminal of IC2 is also connected through R40 to the negative (−) output of the power supply 211.

The SYN and OSC terminals of IC2 are unconnected. The CT terminal of IC2 is connected through C37 to the negative (−) output of the power supply and through R58 to the cathode of LED. The RT terminal of IC2 is connected through R57 to ground and to the anode of LED. The DIS terminal of IC2 is connected through R59 to the junction between the CT terminal and C38. The SS terminal of IC2 is connected through C39 to the negative (−) output of the power supply 211. The S/D and ground terminals of IC2 are connected to the negative (−) output of power supply 211. The S/D and ground terminals of IC2 are connected to the negative (−) output of the power supply. OUTA is connected through R60 to the gate of Q14 of the commutator circuit 221. OUTB is connected through R61 to the gate of Q13. The V+ and VC terminals of IC2 are connected to a regulated positive (+) integrated circuit output of the power supply 211, namely the emitter of Q10.

In operation, the magnitude of the control voltage applied across the control inputs 241 and 242 controls the magnitude of the output of the I+/I− error amplifier of IC2. The output of the error amplifier is internally compared with a logarithmic ramp signal produced at the CT terminal of IC2. The logarithmic ramp signal is created by the combination of C38, LED and R58. The absence of the LED and R58 would result in a substantially linear ramp signal being formed at the CT input. Modifying the linear ramp by LED and R58 to create a logarithmic ramp results in a linear variation in the control signal causing a logarithmic change in the magnitude of the width of the pulses produced at OUTA and OUTB. The resulting logarithmic change in the on/off time of the commutator circuit cause a logarithmic change in light intensity, which is interpretated by the eyes of a user as a linear change for a linear amount of control input voltage change.

The voltage produced at the compensation (CMP) terminal of IC2 is related to the difference between the voltages applied to the I+ and I− terminals of IC2, which voltages are controlled by the control voltage applied to control inputs 241 and 242. Thus, the CMP voltage is related to the magnitude of the control voltage. The voltage at the CMP terminal of IC2 forms a reference voltage for the −CL terminal of IC3 due to the CMP terminal of IC2 being connected through R62 to the −CL terminal of IC3.

The positive output of the π filter 217, i.e., the junction between L5 and C37, is connected through R65 in series with C44 to the negative (−) output of the power supply 211. The junction between R65 and C44 is connected to the I+ terminal of IC3. The junction between R65 and C44 is also connected through R66 in series with C47 and C48 to ground. The junction between C47 and C48 is connected to the CMP terminal of IC3. The input of the current-to-voltage converter 219, i.e., the end of R36 connected to the π filter 217, is connected through R63 in series with C41 to the negative (−) output of the power supply 211. The junction between R63 and C41 is connected to the −CL terminal of IC3. The output of the current-to-voltage converter 219, i.e., the end of R36 connected to the commutator circuit 221, is connected through R64 in series with C42 to the negative (−) output of the power supply 211. The junction between R64 and C43 is connected to the +CL terminal of IC3. The junction between R64 and C43 is also connected through C46 to the junction between C47 and C48.

The RT terminal of IC3 is connected through R68 to the negative (−) output of the power supply 211. The terminal CT of IC3 is connected through C45 to the negative (−) output of the power supply and the GND terminal is directly connected to the negative (−) output of the power supply.

The REF terminal of IC3 is connected through R67 in series with C44 to the negative (−) output of the power supply. The junction between R67 and C44 is connected to the I− terminal of IC3. The same positive (+) power supply voltage applied to IC2 is applied to IC3. More specifically, the regulated positive (+) voltage at the emitter of Q10 is applied to the V+ terminal of IC3. The CB and CA terminals of IC3 are also connected to the same positive (+) power supply source. The EB terminal of IC3 is connected to the anode of D35. The cathode of D35 is connected to the emitter of Q5. The anode of D35 is also connected through R70 to a negative (−) output of the power supply. The junction between the anode of D35 and R70 is connected to the gate of Q15. The emitter of Q15 is connected to the negative (−) output of the power supply. Finally, the shutdown (S/D) terminal of IC3 is connected to the collector of Q11 of the switch 215 and through R69 to the negative (−) output of the power supply.

As will be appreciated from the foregoing description, IC3 is connected to the switch 215 of the embodiment of the invention illustrated in FIGS. 3A–B in a manner similar to the way IC1 was connected to the switch 115 of the embodiment of the invention illustrated in FIGS. 2A–B. More specifically, the EB output of IC3, via a gate drive booster amplifier formed by D35, R70 and Q15, controls the application of switch pulses through R35 to the gate of FET 2. The switch pulses are produced by an internal oscillator that forms part of IC3. The frequency of the pulses is controlled by the values of R68 and C45. The preferred frequency is around 100 kHz.

The magnitude of the current of each pulse applied to the primary winding, P4, of T4 is sensed at the S/D (shutdown) input of IC3 as a result of the connection between the S/D terminal of IC3 and the collector of Q11. If a pulse current magnitude exceeds a predetermined value, determined primarily by the value of R69, the pulse produced at the output of EB is immediately terminated, thereby terminating current flow through FET 2. As a result, like the embodiment of the invention illustrated in FIGS. 2A–B, the embodiment of the invention illustrated in FIGS. 3A–B prevents the current limits of the circuit components from being exceeded on a pulse-by-pulse basis.

Also, like the embodiment of the invention illustrated in FIGS. 2A–B and described above, if the voltage at the output of the π filter 217 exceeds a predetermined value, switching pulses are reduced in duty cycle as a result of the I+/I− error amplifier of IC3 stabilizing as required to just maintain the predetermined value. More specifically, the error amplifier compares the reference voltage applied to the I− terminal with the voltage at the output of the π filter applied to the I+ terminal via R65 and C43. When the sensed volts exceed the reference voltage, the I+/I− error amplifier output voltage falls, reducing the width of the pulse applied to the EB terminal of IC3. This results in FET 2 operating at a reduced duty cycle. The +Cl/−CL error amplifier compares the input controlled voltage at the CMP terminal of IC2 with the voltage output of the current-to-voltage converter 219. Unless overriden by the pulse current or voltage feedback control signals, this comparison controls the period during which switching pulses are produced at the EB terminal of IC3 and, thus, the intensity of the light emitted by the fluorescent lamps 35 and 37.

Hence, in essence, IC3 functions in substantially the same way as IC1 to control the opening and closing of a switch that controls the flow of current through the primary winding of the transformer of the converter.

As will be readily appreciated from the foregoing description, the invention provides a high frequency, electronic fluorescent lamp ballast that controls the operation of fluorescent lamps in a manner that minimizes circuit component size, weight and expense. Size and weight are minimized primarily by minimizing the size of the transformers utilized in the ballast. Transformer size is minimized by applying high frequency power to a flyback converter operated in a discontinuous mode. Low cost components can be utilized because the ballast senses when voltages exceed a level that could result in component destruction and terminates current flow when these levels are reached. Because the commutator circuit that controls the igniting of the fluorescent lamps is operated at a relatively low frequency, the amount of electromagnetic interference generated by the ballast is also minimized.

While preferred embodiments of the invention have been illustrated and described, it will be appreciated that various changes can be made therein without departing from the spirit and scope of the invention. For example, if the filament protection benefits of a multi-legged core transformer are undesired or unnecessary, a standard, single loop core can be used in place of the described flyback transformer. Also, integrated circuits other than the ones specifically described can be used, as well as discrete circuits, provided the desired function can be accomplished. Further, the fluorescent lamp filament power supply can be independent of the arc power supply. In the case of an independent filament power supply, power from the filaments comes from an off line transformer coupled linear source and the filament windings of the transformer of the transformer circuit are eliminated. Current limiting for filament protection can be achieved by including a thermolimiter connected in series with the primary winding of the transformer and functioning such that a shorted filament causes the transformer core to overheat and the thermolimiter switch to open. Consequently, within the scope of the appended claims, the invention can be practiced otherwise than as specifically described herein.

The embodiments of the invention in which an exclusive property or privilege is claimed are defined as follows:

1. A ballast for controlling the light emitted by gas discharge tubes, in particular fluorescent lamps, said ballast comprising:
(A) an energy storage converter comprising:
 (1) a power supply for supplying DC power;
 (2) a transformer circuit including an energy storage transformer having a primary winding and at least one secondary winding and rectifier means connected to said at least one secondary winding; and,
 (3) a switch connected in circuit with said power supply and the primary winding of said transformer such that the opening and closing of said switch repetitively interrupts current applied to said primary winding, said energy storage converter producing a signal representative of the current pulses applied to said primary winding;
(B) a commutator circuit responsive to said current in said primary winding to apply AC power to filaments of said lamp to be controlled by said ballast;

(C) a power sensor connected to said commutator circuit responsive to said AC power therethrough to said filaments to said lamp to provide a signal representative thereof; and (D) a control circuit for receiving at least (i) one control input, (ii) said signal representative of the current pulses applied to said primary winding by the opening and closing of said switch and (iii) said signal from said power sensor representative of the AC power applied across the filaments of said lamp by said commutator circuit, said control circuit including means for applying high frequency switching pulses to said switch being selectively dependent on (a) said at least one control input, (b) said signal representative of the current pulses applied to said primary winding by the opening and closing of said switch and (c) the signal representative of the AC power applied across the filaments of said lamp by said commutator circuit, said control circuit also including means for amplifying a lower frequency control signal to said commutator circuit for supplying starting and operating power across the filaments of said lamp to be controlled by said ballast at a rate substantially lower than the rate of the high frequency switching pulses applied to said switch.

2. A ballast as claimed in claim 1, wherein said signal representative of the current pulses applied to said primary winding by the opening and closing of said switch is a pulse signal whose magnitude corresponds to the magnitude of the pulsating current flow created by the opening and closing of said switch.

3. A ballast as claimed in claim 2, wherein the power applied to said primary winding by the opening and closing of said switch instantaneously terminates when said pulsating signal representative of the current applied to said primary winding by the opening and closing of said switch exceeds a predetermined level.

4. A ballast as claimed in claim 3, wherein said at least one signal representative of the power applied across the filaments of said lamp by said commutator circuit comprises a voltage signal representative of the voltage applied across said filaments and a current signal representative of the current applied to said filaments by said commutator circuit and wherein said control circuit reduces the duty cycle of the high frequency switching pulses applied to said switch when the magnitude of said voltage signal exceeds a predetermined level to the duty cycle time required to just maintain the predetermined level.

5. A ballast as claimed in claim 4, wherein said current signal, in combination with said at least one control input, controls the period during which high frequency switching pulses are applied to said switch when said voltage signal magnitude and said pulse signal magnitude are both below respective reference levels.

6. A ballast as claimed in claim 1, wherein said filament power supply comprises additional secondary windings of said energy storage transformer.

7. A ballast as claimed in claim 6, wherein said signal representative of the current pulses applied to said primary winding by the opening and closing of said switch is a pulse signal whose magnitude corresponds to the magnitude of the pulsating current flow created by the opening and closing of said switch.

8. A ballast as claimed in claim 7, wherein the power applied to said primary winding by the opening and closing of said switch instantaneously terminates when said pulsating signal representative of the current applied to said primary winding by the opening and closing of said switch exceeds a predetermined level.

9. A ballast as claimed in claim 8, wherein said at least one signal representative of the power applied across the filaments of said lamp by said commutator circuit comprises a voltage signal representative of the voltage applied across said filaments and a current signal representative of the current applied to said filaments by said starting circuit and wherein said control circuit reduces the duty cycle of the high frequency switching pulses applied to said switch when the magnitude of said voltage signal exceeds a predetermined level to the duty cycle time required to just maintain the predetermined level.

10. A ballast as claimed in claim 9, wherein said current signal, in combination with said at least one control input, controls the period during which high frequency switching pulses are applied to said switch when said voltage signal magnitude and said pulse signal magnitude are both below respective reference levels.

11. A ballast as claimed in claim 6, including a $\pi$ filter connected between the winding of the transformer of said transformer circuit connected to said commutator circuit and said commutator circuit.

12. A ballast as claimed in claim 11, wherein said $\pi$ filter has a fast rise time at the frequency of operation of said commutator circuit.

13. A ballast as claimed in claim 12, wherein said signal representative of the current pulses applied to said primary winding by the opening and closing of said switch is a pulse signal whose magnitude corresponds to the magnitude of the pulsating current flow created by the opening and closing of said switch.

14. A ballast as claimed in claim 13, wherein the power applied to said primary winding by the opening and closing of said switch instantaneously terminates when said pulsating signal representative of the current applied to said primary winding by the opening and closing of said switch exceeds a predetermined level.

15. A ballast as claimed in claim 14, wherein said at least one signal representative of the power applied across the filaments of said lamp by said commutator circuit comprises a voltage signal representative of the voltage applied across said filaments and a current signal representative of the current applied to said filaments by said commutator circuit and wherein said control circuit reduces the duty cycle of the high frequency switching pulses applied to said switch when the magnitude of said voltage signal exceeds a predetermined level to the duty cycle time required to just maintain the predetermined level.

16. A ballast as claimed in claim 15, wherein said current signal, in combination with said at least one control input, controls the period during which high frequency switching pulses are applied to said switch when said voltage signal magnitude and said pulse signal magnitude are both below respective reference levels.

17. A ballast as claimed in claim 11, including a current-to-voltage converter connected between said $\pi$ filter and said commutator circuit, said current-to-voltage converter producing said current signal.

18. A ballast as claimed in claim 1, wherein the number of fluorescent lamps to be controlled is equal to two and wherein said commutator circuit comprises a bridge circuit that alternately applies starting voltages to said two lamps.

19. A ballast as claimed in claim 18, wherein said signal representative of the current pulses applied to said primary winding by the opening and closing of said switch is a pulse signal whose magnitude corresponds to the magnitude of the pulsating current flow created by the opening and closing of said switch.

20. A ballast as claimed in claim 19, wherein the power applied to said primary winding by the opening and closing of said switch instantaneously terminates when said pulsating signal representative of the current applied to said primary winding by the opening and closing of said switch exceeds a predetermined level.

21. A ballast as claimed in claim 20, wherein said at least one signal representative of the power applied across the filaments of said lamp by said commutator circuit comprises a voltage signal representative of the voltage applied across said filaments and a current signal representative of the current applied to said filaments by said commutator circuit and wherein said control circuit reduces the duty cycle of the high frequency switching pulses applied to said switch when the magnitude of said voltage signal exceeds a predetermined level to the duty cycle time required to just maintain the predetermined level.

22. A ballast as claimed in claim 21, wherein said current signal, in combination with said at least one control input, controls the period during which high frequency switching pulses are applied to said switch when said voltage signal magnitude and said pulse signal magnitude are both below respective reference levels.

23. A ballast as claimed in claim 1, wherein said power supply receives AC power and produces DC power.

24. A ballast as claimed in claim 23, wherein the frequency of said AC power is substantially lower than the frequency of said high frequency switching pulses applied to said switch and wherein said AC power is applied to said commutator circuit to control the application of starting power across the filaments of said lamp to be controlled by said ballast.

25. A ballast as claimed in claim 1, wherein said switch is a solid state switch.

26. A ballast as claimed in claim 25, wherein said solid state switch is a MOSFET.

27. A ballast as claimed in claim 1, wherein said control circuit includes a regulating pulse with modulator that includes an oscillator.

28. A ballast for controlling the light emitted by a gas discharge lamp comprising:
converter means connectable to a source of power for selectively converting at a first frequency said source power into direct current power;
commutator means operatively connected to said converter means for converting at a second frequency different from said first frequency said direct current power to alternating current power, said commutator means connectable to said gas discharge lamp to provide said alternating current power at said second frequency thereto to cause said gas discharge lamp to emit light;
sensing means connected to said commutator means for sensing power applied to said gas discharge lamp through said commutator means, and providing a lamp power feedback signal representative thereof; and
control means responsive to said sensing means for causing said converter means to terminate conversion of said source power into direct current power when said lamp power feedback signal exceeds a predetermined magnitude.

29. The ballast as claimed in claim 28 including control input means connected to said control means for providing a light intensity signal; and wherein said control means includes light intensity signal responsive means for causing said converter means to terminate conversion of said source power into direct current power when said light emitted by said gas discharge lamp exceeds a magnitude corresponding to said light intensity signal.

30. The ballast as claimed in claim 28 including control input means connected to said control means for providing a light intensity signal; and wherein said control means includes light intensity signal responsive means for causing said commutator means to terminate conversion of said direct current power into said alternating current power when said light emitted by said gas discharge lamp exceeds a magnitude corresponding to said light intensity signal.

31. The ballast as claimed in claim 28 wherein said converter means includes peak current sensing means for sensing the peak current of said direct current power through said converter means and providing peak current feedback representative thereof; and said control means incudes peak current feedback responsive means for causing said converter means to terminate conversion of said source power into direct current power when said peak current feedback exceeds a predetermined magnitude.

32. The ballast as claimed in claim 28 wherein said sensing means includes means for sensing current through said gas discharge lamp and through said commutator means, and said control means includes means for setting a predetermined current magnitude at which said converter means terminates conversion of said source power into direct current power.

33. The ballast as claimed in claim 28 wherein said sensing means includes means for sensing voltage across said gas discharge lamp and said control means includes means for setting a predetermined voltage magnitude at which said convertor means terminates conversion of said source power into direct current power.

34. The ballast as claimed in claim 28 wherein said control means includes means for setting said first frequency.

35. The ballast as claimed in claim 28 wherein said control means includes means for setting said second frequency.

36. The ballast as claimed in claim 28 including starting means connected to said commutator means for rapidly starting said gas discharge lamp.

37. The ballast as claimed in claim 28 wherein said converter means includes heating means for providing additional direct current power to said gas discharge lamp.

38. The ballast as claimed in claim 37 wherein said converter means includes additional heating means for providing said additional direct current to a second gas discharge lamp; and said converter means includes transformer means connected to said heating means and said additional heating means to cause current sharing there between.

39. A ballast for controlling the light emitted by a gas discharge lamp comprising:

converter means connectible to a source of power for selectively converting at a high frequency said source power into direct current at a high voltage;

commutator means connected to said converter means for converting at a low frequency lower than said high frequency said direct current at said high voltage into alternating current at a low frequency and said high voltage, said commutator means connected to said gas discharge lamp to provide said alternating current at said low frequency and said high voltage thereto to cause said gas discharge lamp to emit light;

current to voltage converter means connected to said commutator means for sensing current and voltage to said gas discharge lamp through said commutator means, and respectively providing current and voltage feedback signals proportional thereto; and control means connected to said converter means, said commutator means, and said voltage to current converter means, said control means including current feedback responsive means for causing said converter means to terminate conversion of said source power into direct current when said current feedback signal exceeds a predetermined magnitude, and said control means including voltage feedback responsive means for causing said converter to terminate conversion of said source power into direct current when said voltage feedback signal exceeds a predetermined magnitude.

40. The ballast as claimed in claim 39 including control input means connected to said control means for providing a variable light intensity signal; and wherein said control means includes light intensity signal responsive means for causing said converter means to terminate conversion of said source power during variable portions of time during said high frequency conversion of said source power into direct current when said light emitted by said gas discharge lamp exceeds a magnitude corresponding to said light intensity signal.

41. The ballast as claimed in claim 39 including control input means connected to said control means for providing a variable light intensity signal; and wherein said control means includes light intensity signal responsive means for causing said commutator means to terminate conversion of said direct current to said alternating current during a portion of each cycle of said low frequency conversion when said light emitted by said gas discharge lamp exceeds a magnitude corresponding to said variable light intensity signal.

42. The ballast as claimed in claim 39 wherein said converter means includes high frequency switching means for selectively allowing the passage of pulsating direct current through said converter means, and current sensing means connected to said high frequency switching means to provide a feedback proportional to peak of said pulsating direct current; and said control means includes peak current feedback responsive means for causing said high frequency switching means to terminate switching when said peak current feedback signal exceeds a predetermined magnitude.

43. The ballast as claimed in claim 39 wherein said control means includes means for setting a predetermined current magnitude at which said converter means instantaneously terminates conversion of said source power at said high frequency until said current magnitude is below said predetermined current magnitude.

44. The ballast as claimed in claim 39 wherein said control means includes means for setting a predetermined voltage magnitude above which said converter means instantaneously terminates conversion of said source power at said high frequency until said voltage magnitude is below said predetermined voltage magnitude.

45. The ballast as claimed in claim 39 wherein said control means includes replaceable means for setting said high frequency.

46. The ballast as claimed in claim 39 wherein said source provides alternating current at a source frequency and said control means includes means for causing said low frequency to be substantially equal to said source frequency.

47. The ballast as claimed in claim 39 including a filter connected between said converter means and said commutator means for rapid start of said gas discharge lamp.

48. The ballast as claimed in claim 39 wherein said converter means includes heating means for providing pulsating direct current at a low voltage, said heating means includes means for filtering and providing said pulsating direct current to said gas discharge lamp.

49. The ballast as claimed in claim 48 wherein said converter means includes further heating means for providing said additional pulsating direct current at said low voltage to a second gas discharge lamp; and said converter means includes integrated magnetic current transformer means connected to said heating means and said further heating means to cause current sharing between said gas discharge lamps.

50. A ballast for controlling light emitted by a gas discharge tube having a filament disposed at each end, comprising:

a converter connectible to a source of low frequency alternating current, said converter including primary rectifier circuitry connected to said source of low frequency alternating current for converting said alternating current into pulsating direct current, said converter including first and second transformers each having primary and secondary windings, said primary winding of said first transformer connected to said primary rectifier circuitry and said primary winding of said second transformer connected to said source of low frequency alternating current, said converter including secondary rectifier circuitry connected to said secondary winding of said first transformer, said converter including primary switching circuitry connected to said primary rectifier circuitry and said primary winding responsive to a primary switch signal to cause an alternating current to flow through said primary winding;

commutator circuitry connected to said converter, said commutator circuitry including bridge circuitry connected to said secondary winding of said second transformer to convert direct current applied thereto to alternating current at a low frequency equal to said low frequency of said alternating current of said source, said bridge circuitry connected to said secondary rectifier circuitry for receiving direct current therefrom, said bridge circuitry connectible to said filaments of said gas discharge tube to provide low frequency alternating current thereto;

a current sensor connected to said bridge circuitry for sensing current through commutator circuitry and said filaments to provide a current feedback signal proportional thereto;

a voltage sensor connected to said bridge circuitry for sensing voltage across said commutator circuitry and across said filaments to provide a voltage feedback signal proportional thereto; and control circuitry connected to said converter, said commutator circuitry, said current sensor, and said voltage sensor, said control circuitry including a voltage control circuit responsive to said voltage feedback signal below a predetermined magnitude to provide said primary switch signal at a predetermined high frequency higher than said low frequency and to said voltage feedback signal above said predetermined magnitude to instantaneously terminate said primary switch signal, said control circuitry including a current control circuit responsive to said current feedback signal below a predetermined magnitude to provide said primary switch signal at said predetermined high frequency and to said current feedback signal above said predetermined magnitude to terminate said primary switch signal.

51. The ballast as claimed in claim 50 including control input means connected to said control means for providing on, dim, and off light intensity signals; and wherein said control means includes light intensity signal responsive means for causing said converter means to terminate conversion of said power during a portion of each cycle of said high frequency switching when said current feedback signal exceeds magnitudes corresponding to said on, dim, and off light intensity signals.

52. A ballast for controlling light emitted by a gas discharge tube having a filament disposed at each end, comprising:

a converter connectible to a source of direct current, said converter including a transformer having a primary and secondary winding, said primary winding connectible to said source of direct current, said converter including secondary rectifier circuitry connected to said secondary winding, said converter including primary switching circuitry connected to said primary winding responsive to a primary switch signal to cause and terminate alternating current flow through said primary winding, commutator circuitry connected to said converter, said commutator circuitry including bridge circuitry connected to said secondary rectifier circuitry to receive direct current therefrom and responsive to a commutator control signal to provide alternating current to said gas discharge tube;

a current sensor connectible to said bridge circuitry for sensing current through said commutator circuitry and said filaments to provide a current feedback signal proportional thereto;

a voltage sensor connectible to said bridge circuitry for sensing voltage across said commutator circuitry and said filaments to provide a voltage feedback signal proportional thereto; and control circuitry connected to said converter, said commutator circuitry, said current sensor, and said voltage sensor, said control circuitry including a voltage control circuit responsive to said voltage feedback signal below a predetermined magnitude to provide said primary switch signal at a predetermined high frequency and to said voltage feedback signal above said predetermined magnitude to instantaneously terminate said primary switch signal, said control circuitry including a current control circuit responsive to said current feedback signal below a predetermined magnitude to provide said primary switch signal at said predetermined high frequency and to said current feedback signal above said predetermined magnitude to instantaneously terminate said primary switch signal, said control circuitry including a bridge frequency control circuit to provide said commutator control signal at a predetermined low frequency below said high frequency.

53. The ballast as claimed in claim 52 including control input means connected to said control circuitry for providing a linear variable light intensity signal; and wherein said control means includes light intensity signal responsive means for causing said commutator means to terminate conversion of said direct current to said alternating current during a logarithmic portion of each cycle of said low frequency conversion when said current feedback signal exceeds magnitudes corresponding to various magnitudes of said liner variable light intensity signal.

54. The ballast as claimed in claim 50 or 52 wherein said converter includes current sensing means connected to said primary switching circuitry to provide a feedback proportional to the peak of said current therethroug; and said control circuitry includes peak current feedback responsive means for causing said primary switching circuitry to instantaneously terminate switching when said peak current feedback signal exceeds a predetermined magnitude.

55. The ballast as claimed in claim 50 or 52 wherein said control circuitry includes a replaceable resistor for setting a predetermined current magnitude at which said converter instantaneously terminates conversion of said power during a single switching of said primary switching circuitry.

56. The ballast as claimed in claim 50 or 52 wherein said control means includes a replaceable capacitor for setting a predetermined voltage magnitude above which said conversion instantaneously terminates conversion of said power during a single switching of said primary switching circuitry.

57. The ballast as claimed in claim 50 or 52 wherein said control means includes a replaceable resistor and capacitor set for setting said high frequency.

58. The ballast as claimed in claim 50 or 52 including a pi filter connected between said converter and said commutator circuitry for rapid start of said gas discharge tube.

59. The ballast as claimed in claim 50 or 52 wherein said converter includes a further secondary winding and a further secondary rectifier circuit for providing said direct current at a low voltage to a filament of said gas discharge tube.

60. The ballast as claimed in claim 59 wherein said converter includes an additional secondary winding for providing said direct current at said low voltage to a filament of a second gas discharge tube; and said converter includes an integrated magnetic current transformer connected to said further and additional secondary windings to cause current sharing therebetween.

* * * * *